US012344007B2

(12) United States Patent
Navas Sanchez et al.

(10) Patent No.: US 12,344,007 B2
(45) Date of Patent: Jul. 1, 2025

(54) ORIENTATION ADJUSTMENTS

(71) Applicant: Hewlett-Packard Development Company, L.P., Spring, TX (US)

(72) Inventors: Borja Navas Sanchez, Sant Cugat del Valles (ES); Ramon Viedma Ponce, Sant Cugat del Valles (ES); Joan Farre Bravo, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 190 days.

(21) Appl. No.: 18/250,678

(22) PCT Filed: Oct. 27, 2020

(86) PCT No.: PCT/US2020/057528
§ 371 (c)(1),
(2) Date: Apr. 26, 2023

(87) PCT Pub. No.: WO2022/093191
PCT Pub. Date: May 5, 2022

(65) Prior Publication Data

US 2023/0406004 A1 Dec. 21, 2023

(51) Int. Cl.
*B41J 2/235* (2006.01)
*B41J 29/38* (2006.01)

(52) U.S. Cl.
CPC .............. *B41J 2/235* (2013.01); *B41J 29/38* (2013.01)

(58) Field of Classification Search
CPC .................................. B41J 2/235; B41J 29/38
See application file for complete search history.

(56) References Cited

U.S. PATENT DOCUMENTS

| | | | | |
|---|---|---|---|---|
| 8,596,217 | B2 | 12/2013 | Kipfer et al. | |
| 9,849,703 | B2 | 12/2017 | Priyadarshi | |
| 10,377,129 | B2 | 8/2019 | Ishikawa | |
| 11,141,752 | B2 * | 10/2021 | Baker | H10K 71/00 |
| 2011/0039021 | A1 | 2/2011 | Persson et al. | |

FOREIGN PATENT DOCUMENTS

| | | | |
|---|---|---|---|
| CN | 101941335 | A | 1/2011 |
| GB | 2525680 | A | 11/2015 |
| WO | 2018/009711 | A1 | 1/2018 |
| WO | 2018/020203 | A1 | 2/2018 |

* cited by examiner

*Primary Examiner* — Thinh H Nguyen
(74) *Attorney, Agent, or Firm* — Jordan IP Law, LLC

(57) ABSTRACT

An example method is described in which a property is measured associated with a vertical displacement of a supporting frame of a printing system, the printing system having a floating frame mounted on the supporting frame, and the floating frame comprising a position sensor of the printing system and a nozzle to eject a drop of print agent; an orientation of the floating frame is adjusted with respect to the supporting frame based on the measured property.

13 Claims, 11 Drawing Sheets

ORIENTATION ADJUSTMENTS

BACKGROUND

A printing system may include a pen or a print head to apply a print fluid on a printing substrate so as to print a plot or an image. The quality of the printed image depends on a number of factors, including the accuracy in the positioning of the print fluid on the printing substrate. This accuracy in turn may depend inter alia on vertical displacements of the printing system.

BRIEF DESCRIPTION

Figure 1:
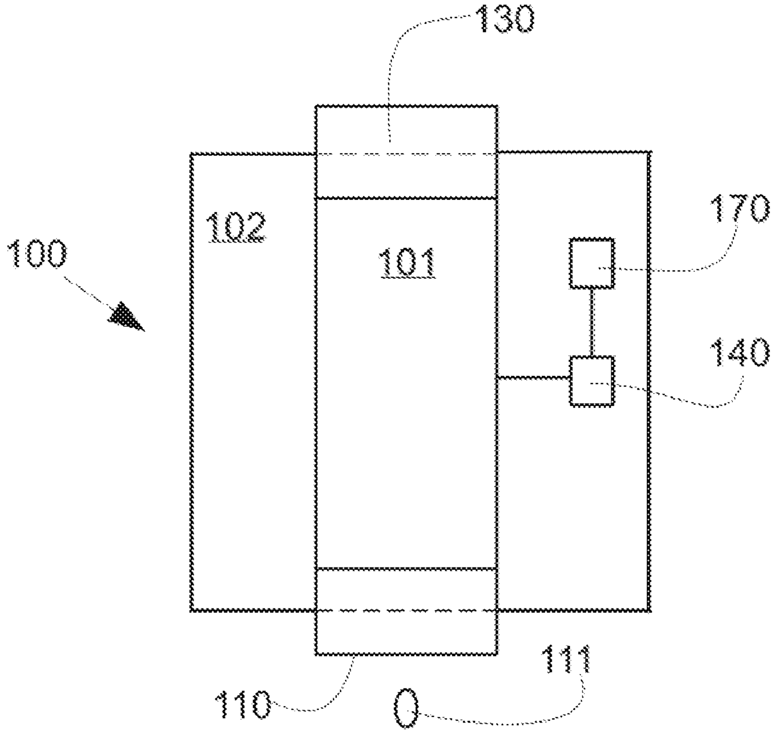

Various example features will be apparent from the detailed description which follows, taken in conjunction with the accompanying drawings, wherein:

FIG. 1 schematically represents a printing system according to an example of the present disclosure.

Figure 2:
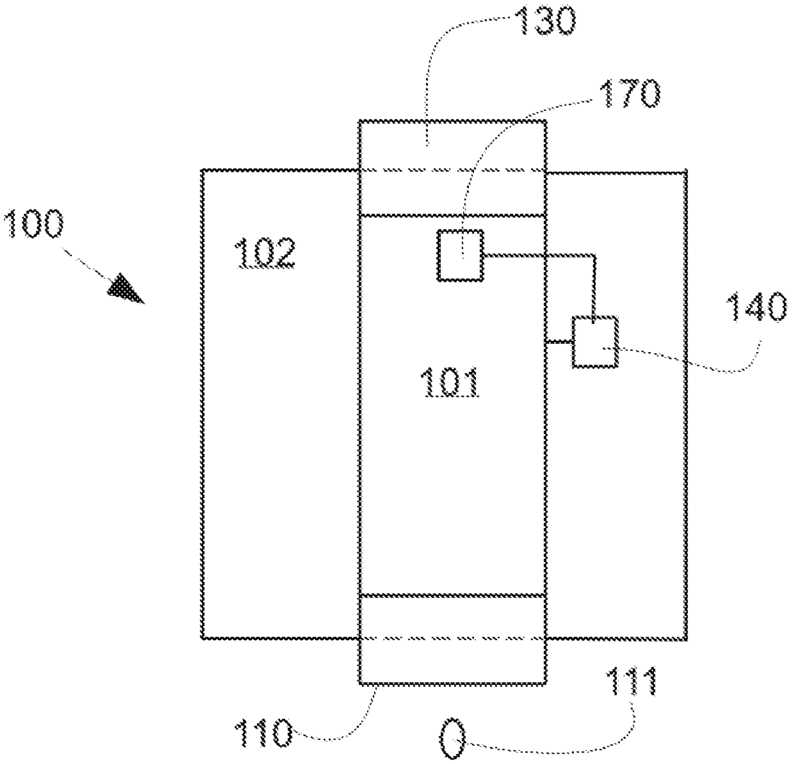

FIG. 2 schematically represents a printing system according to an example of the present disclosure.

Figure 3:
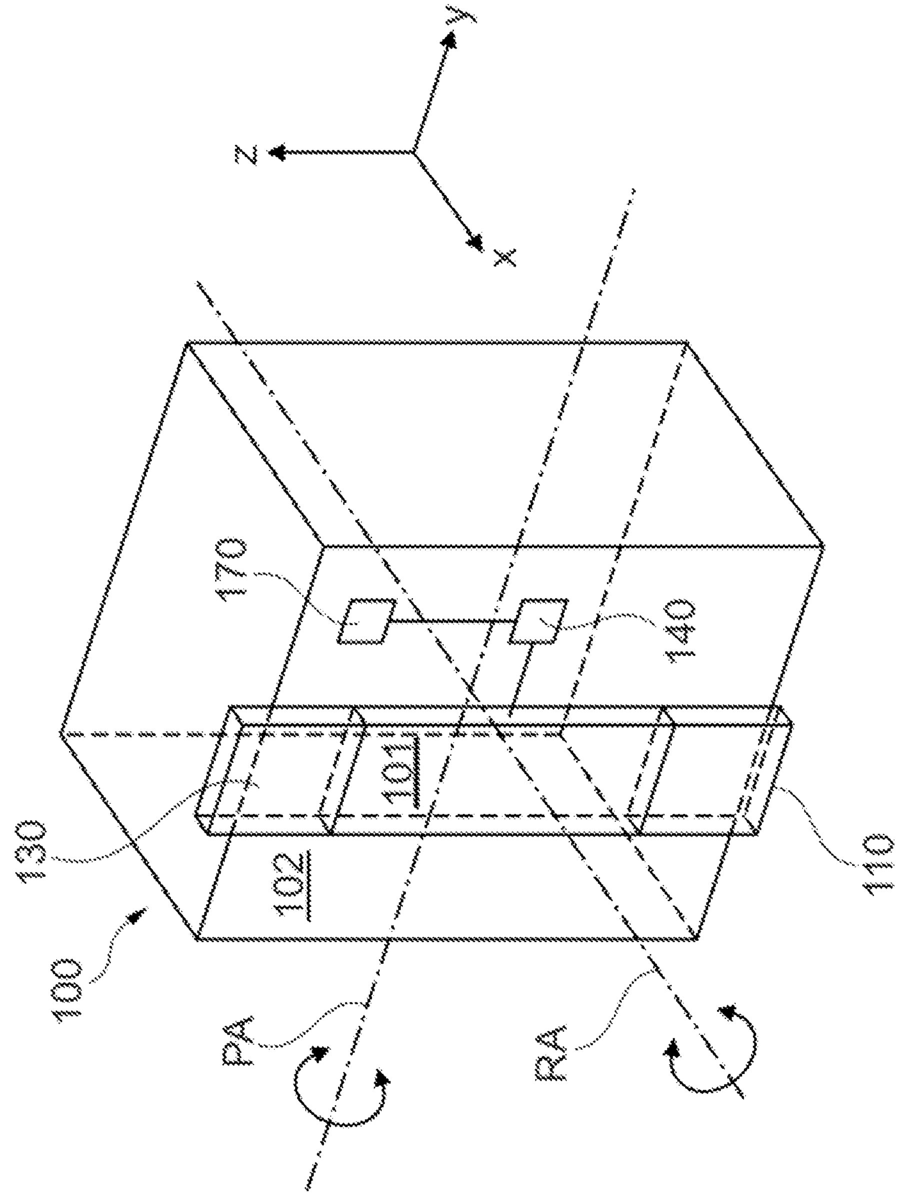

FIG. 3 schematically represents a perspective view of a printing system according to an example of the present disclosure.

Figure 4:
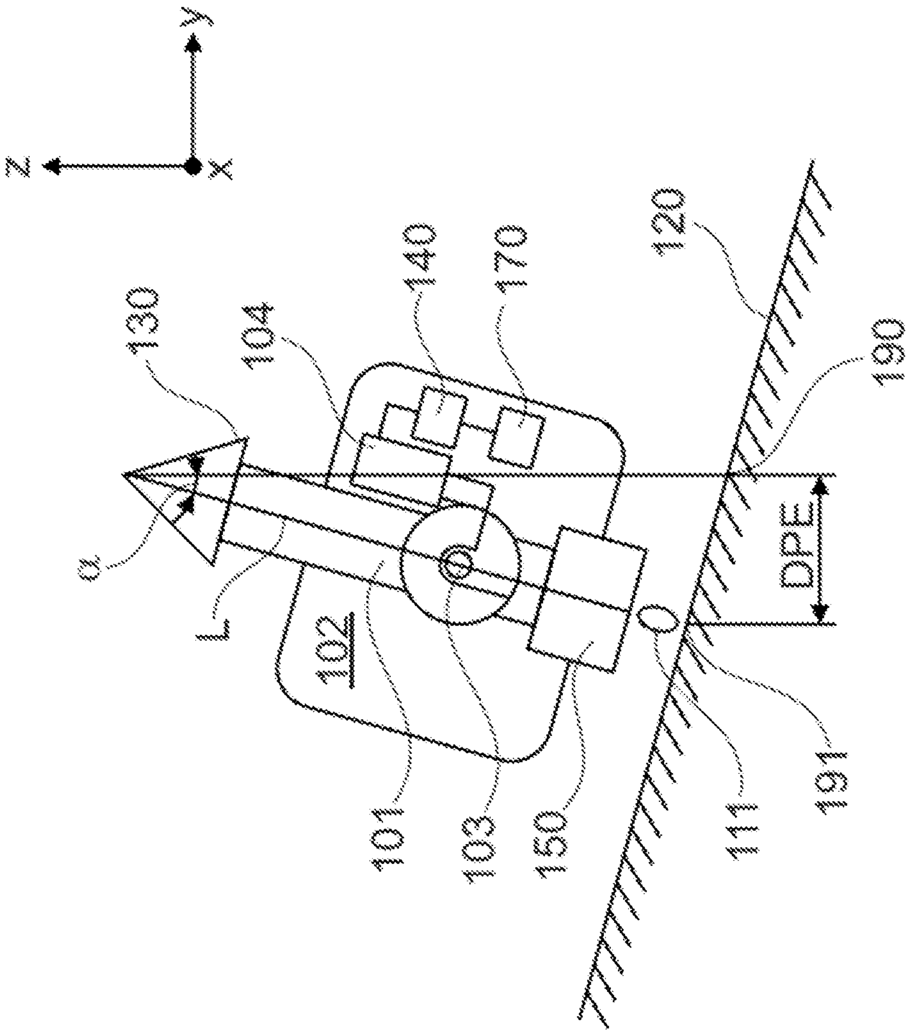

FIG. 4 schematically represents a printing system on a printing substrate with a drop placement error.

Figure 5:
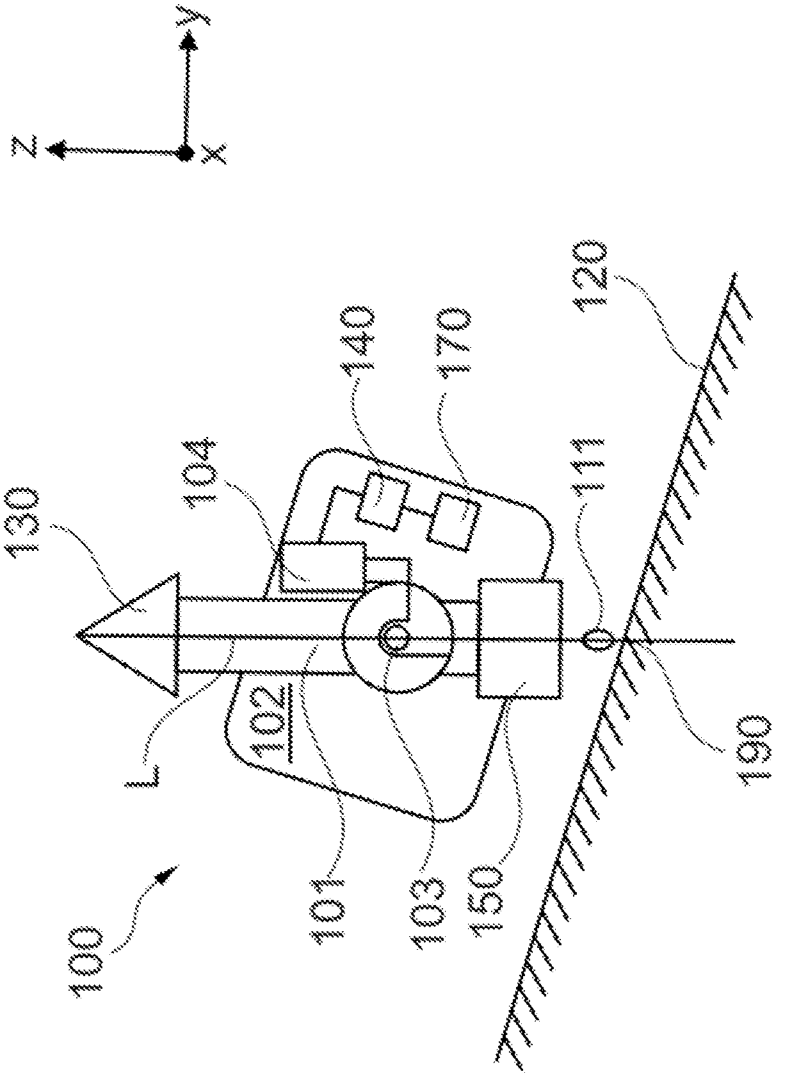

FIG. 5 schematically represents a printing system according to an example of the present disclosure.

Figure 6:
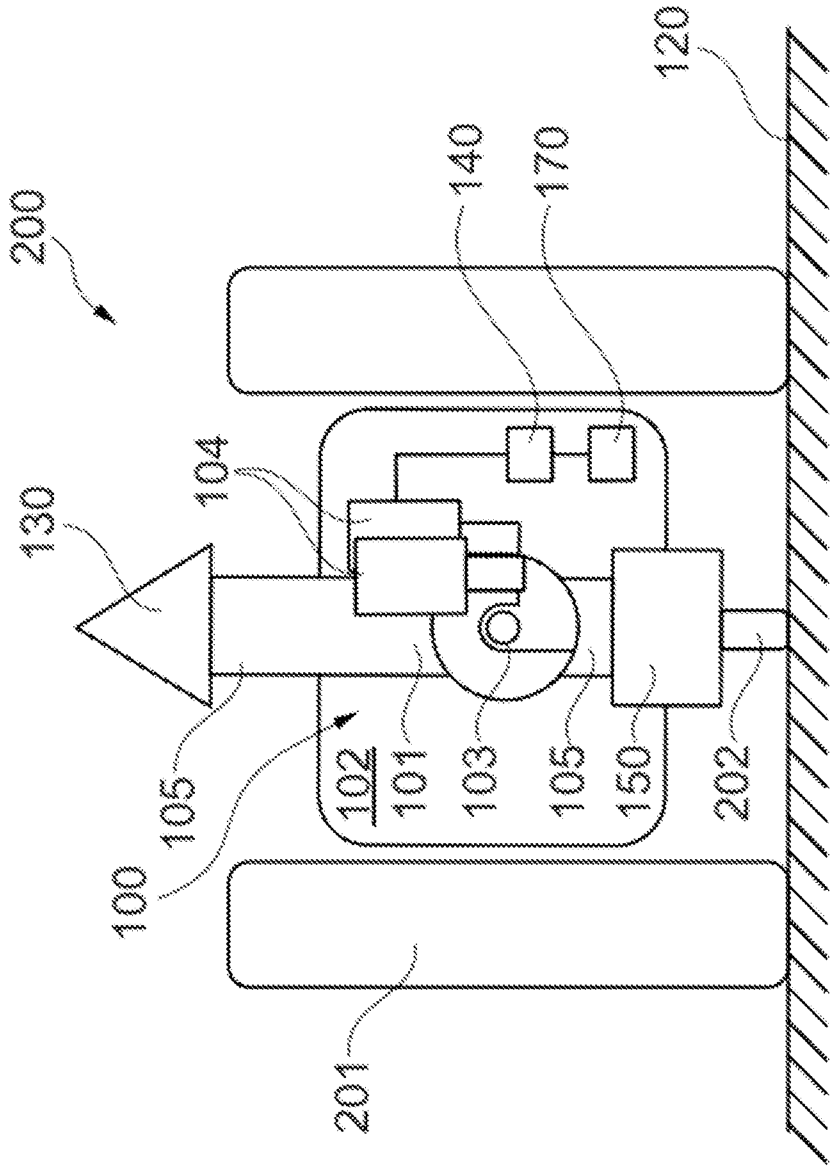

FIG. 6 schematically represents a front view of a vehicle according to an example of the present disclosure.

Figure 7:
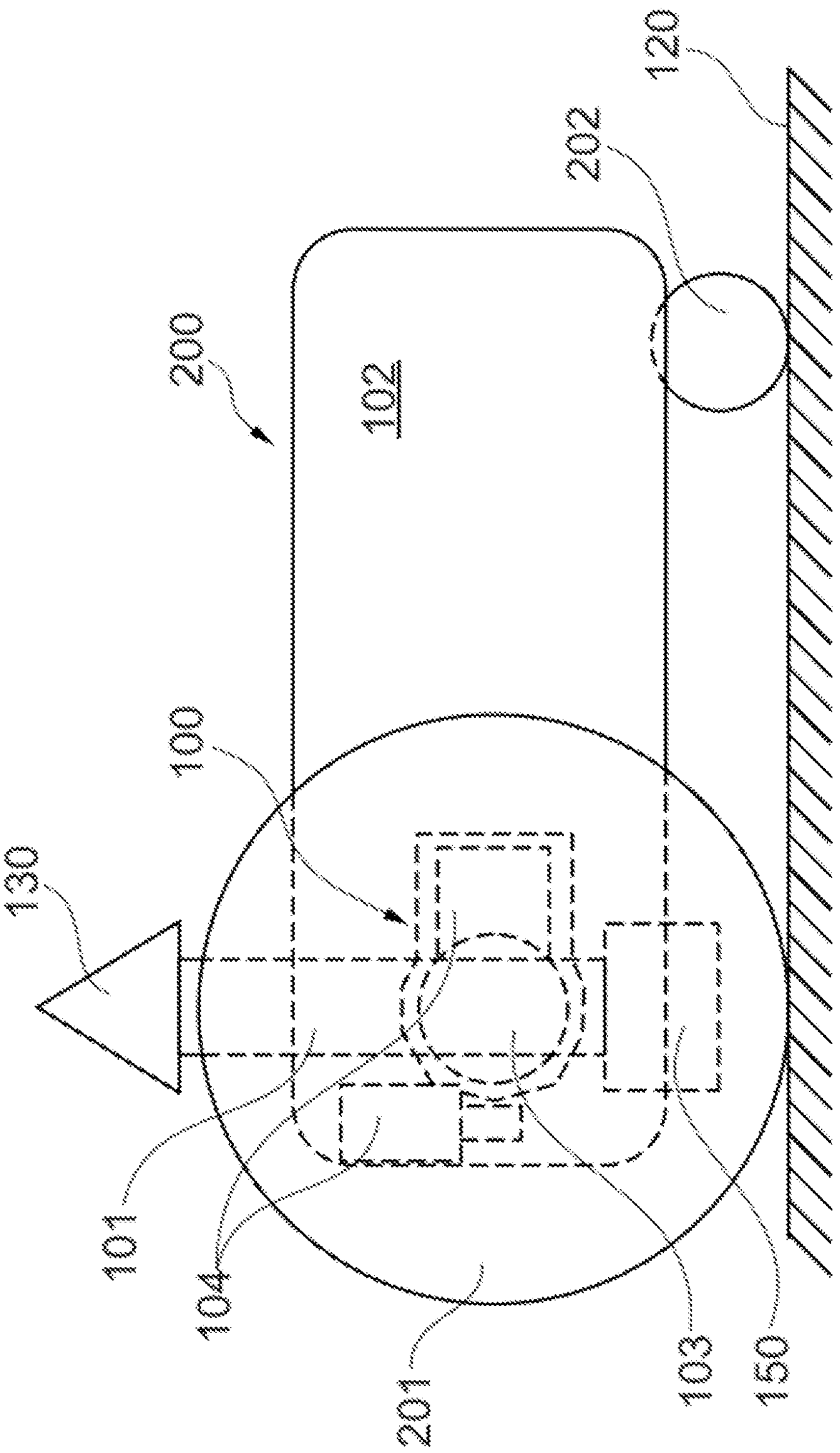

FIG. 7 schematically represents a side view of the vehicle of FIG. 6.

Figure 8:
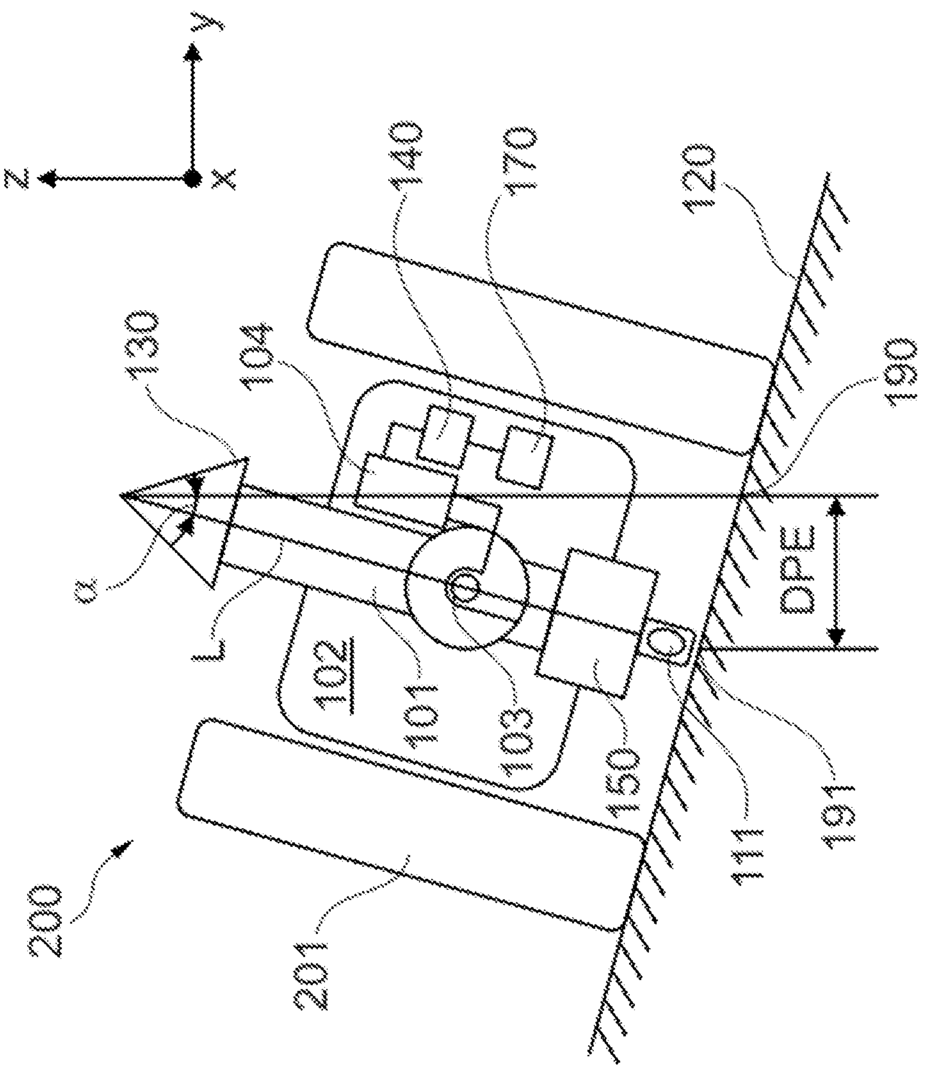

FIG. 8 schematically represents a vehicle on a printing substrate with a drop placement error.

Figure 9:
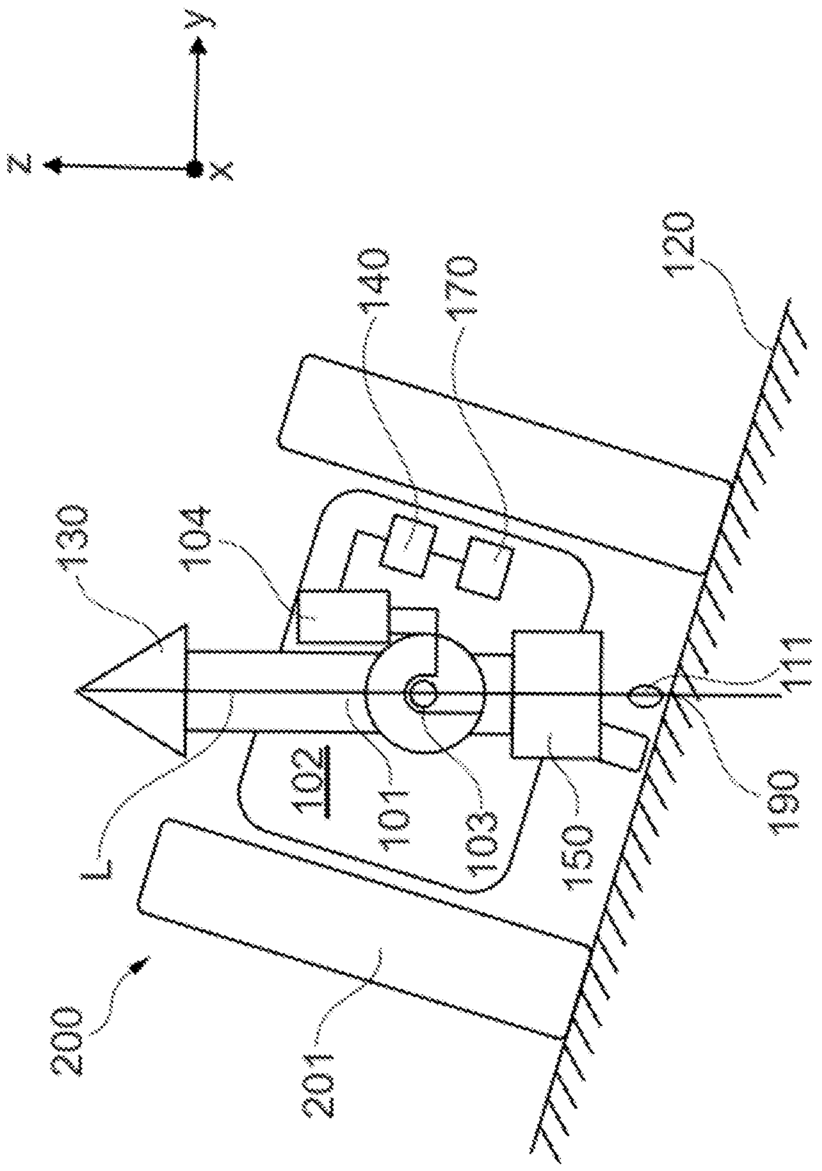

FIG. 9 schematically represents a vehicle according to an example of the present disclosure.

Figure 10:
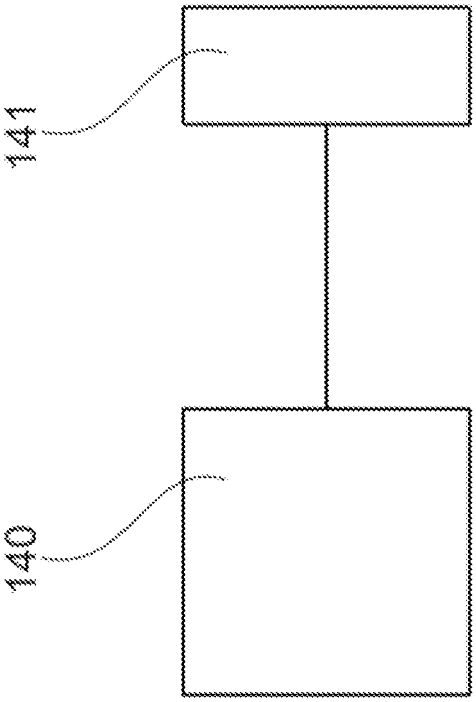

FIG. 10 schematically illustrates a non-transitory machine-readable storage medium with a processor of the FIG. 1.

Figure 11:
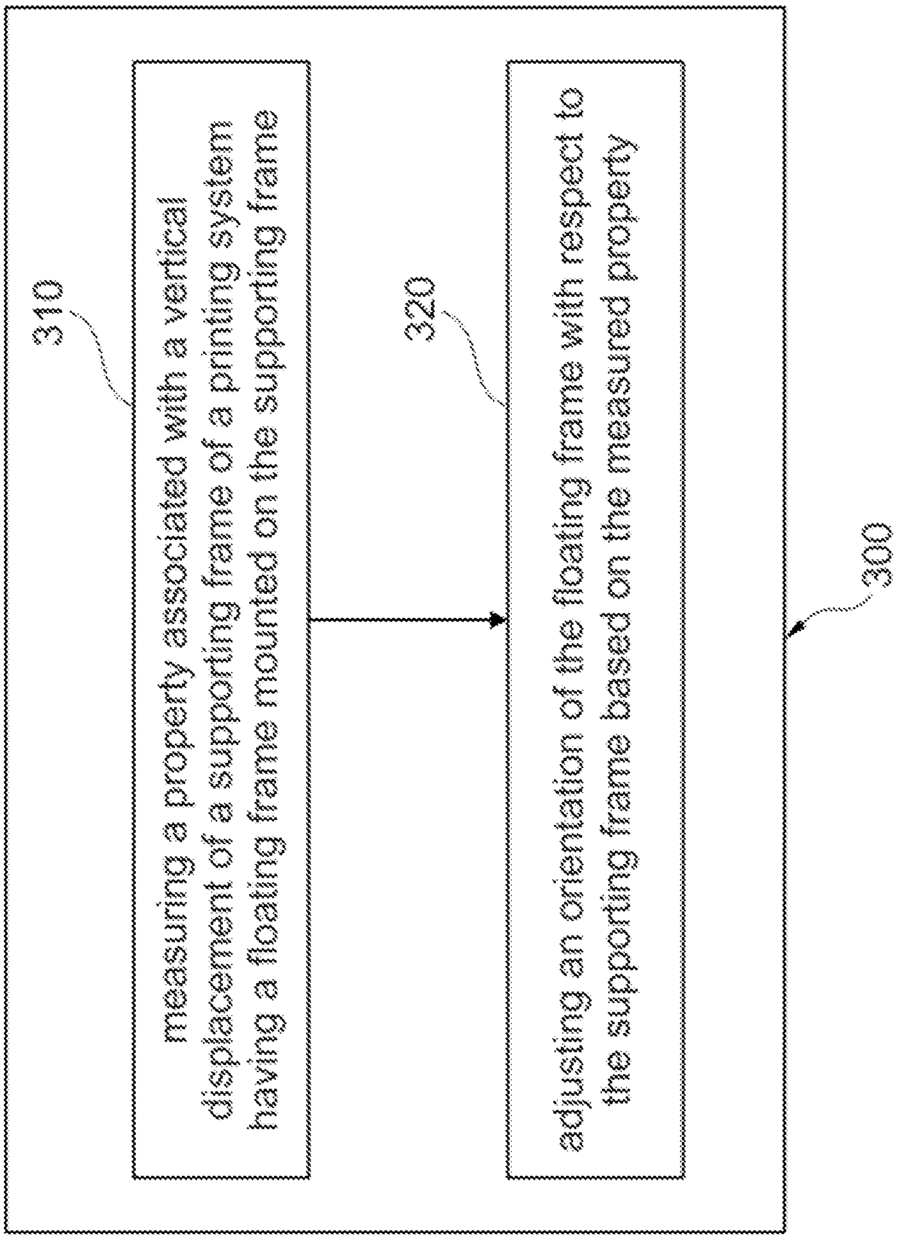

FIG. 11 is a block diagram of an example of a method of the present disclosure.

DETAILED DESCRIPTION

In the drawings, non-visible elements have been represented with dashed lines.

FIG. 1 schematically represents a printing system according to an example of the present disclosure. The printing system 100 comprises: a floating frame 101 attached to a supporting frame 102, the movable chassis 101 to carry a nozzle 110 to eject a drop of print agent 111, and a position sensor 130, an inertial sensor 170 indicative of vertical movement of the printing system and a processor 140 to adjust a position of the floating frame 101 relative to the supporting frame 102 based on a reading of the inertial sensor 170.

In some examples, a floating frame may be understood as a movable and/or dynamic frame with respect to a reference such as a supporting frame. The floating frame may be an element or system attached or arranged on the supporting frame in such a way that it can change its position or orientation with respect to the supporting frame. In some examples, a supporting frame may be understood as a base and/or holding frame, i.e. an element or system on which the floating frame is arranged. The supporting frame may itself be movable, e.g. displaceable with respect to a printing substrate.

In some examples, a frame may be understood as a structure, chassis or similar mounting support for mechanisms or other elements.

In the example of FIG. 1, the inertial sensor 170 is placed on the base chassis or supporting frame 102. In some examples, the inertial sensor 170 may be placed on the movable chassis or floating frame 101 as in FIG. 2. FIG. 2 schematically represents a printing system according to an example of the present disclosure.

In examples, the position sensor 130 may be provided higher than the nozzle 110 relative to a printing substrate. in some examples, the nozzle 110 may be positioned in the printing system 100 to be closer to the printing substrate 120 than the position sensor 130.

In some examples, the inertial sensor 170 may comprise an accelerometer. in some examples, the accelerometer may be to sense or measure an acceleration such as a vertical acceleration.

In examples, the inertial sensor 170 may comprise a gyroscope. In some examples, the gyroscope may be to sense or measure a speed such as an angular speed.

FIG. 3 schematically represents a perspective view of a printing system according to an example of the present disclosure. In FIG. 3 a roll axis RA and a pitch axis PA of the printing system are illustrated. In some examples, the roll axis RA and pitch axis PA of the supporting frame 102 may be substantially the same as the roll and pitch axes of the printing system 100.

In FIG. 3 a three-dimensional coordinate system such as a Cartesian coordinate system with three axes, namely x, y and z, is illustrated. In some examples, z-axis may be related to a vertical axis or vertical dimension. In examples, the z-axis may be referred to gravity, i.e. z-axis may represent a direction of gravity force.

In some examples, the printing system 100 may be displaced over or moves across the plane x, y that may be defined by x, y axes of FIG. 3.

In examples, a vertical movement or displacement may mean a movement or displacement that may include a vertical component, i.e. a z-axis component.

In examples, a movement of the printing system 100 or the supporting frame 102 about the roll axis RA or pitch axis PA may have a vertical component illustrated as z-axis in FIG. 3.

In some examples, a vertical movement or displacement of the printing system 100 may be caused by an uneven printing substrate 120 or items such as obstacles on the printing substrate 120 or changes in tilt of printing substrate 120. A change in tilt may be seen in FIGS. 4 and 5.

In examples, a vertical movement may be caused by air streams.

In examples, a vertical movement or displacement may be associated with a vertical acceleration.

In examples, the vertical movement may be associated with a displacement of the printing system 100 about at least one of a pitch axis PA or a roll axis RA of the printing system 100.

FIG. 4 schematically represents a printing system on a printing substrate with a drop placement error. The printing system may comprise the nozzle 110 or a print head 150, and the position sensor 130. The position sensor 130 may provide the printing system 100 with data regarding the position of the printing system, for instance relative to the printing substrate 120 or any other reference. With the position data, a trajectory or position of the printing system 100 may be adjusted to keep the printing system in an expected position or location associated, for instance, with x, y coordinates. Although there may be a distance between the nozzle 110 or print head 150 and the position sensor 130, this distance, and so relative position between nozzle and position sensor 130, may be known so the drop of print agent 111 may be deposited or provided on the proper target of the printing substrate 120 based on the readings of the position sensor 130. The latter may occur when the printing substrate 120 is substantially smooth and flat, e.g. the printing substrate may be parallel to the plane x, y or void of obstacles. When the printing system follows or describes a vertical movement as illustrated in FIG. 4, in such a way that an angle α may be defined by the angular motion of a line L between the position sensor 130 and the nozzle 110 or print head 150. The angular motion may be described by the line L about the position sensor 130. The angular motion may be defined and from a position of the nozzle 110 before the vertical movement occurs to a position of the nozzle 110 after the vertical movement occurs. An offset of the nozzle may occur in a plane x, y. Thus, the drop of print agent 111 may land on a wrong location. The offset may lead to a significant drop placement error DPE, i.e. an error distance between the theoretic target 190 and the actual landing point 191. The drop placement error DPE may consequently lead to errors on the rendered job. A drop of print agent 111 may be away from a theoretic target 190 by the error distance. The drop placement error DPE may be defined between theoretic target 190 and actual landing point 191.

FIG. 5 schematically represents a printing system according to an example of the present disclosure. A landing of the drop in the theoretic target 190 on the printing substrate 120 may be obtained.

The examples of FIGS. 4 and 5 may be associated to driving units so as to be displaced over the printing substrate 120.

A property of vertical movement of the printing system 100 may be read, indicated or sensed by the inertial sensor 170. By adjusting the position of the floating frame 101 relative to the supporting frame 102 based on a reading of the inertial sensor 170, the drop of print agent 111 may reach the theoretic target 190 in spite of the vertical movement of the printing system 100. Consistency and accuracy in rendered job may be enhanced at any floor conditions. In examples, the floor conditions may mean the printing substrate conditions.

By virtue of the printing system 100 of FIG. 1, substrate conditions-induced errors on drop placement may be minimized.

The example of FIG. 5 may be related to a vertical movement and may be associated with a movement of the printing system 100 about the roll axis RA. In some examples, the vertical movement may be associated with a movement of the printing system 100 about the pitch axis PA.

In examples, the processor 140 may continuously adjust the position of the floating frame 101 relative to the supporting frame 102 based on data received from the inertial sensor 170. A property associated with the vertical displacement may be real-time controlled and the position of the floating frame 101 with respect to the supporting frame 102 may be changed accordingly. Therefore, the printing system 100 may adapt the adjustment of the orientation of the floating frame 101 for variable floor conditions. The printing system 100 may perform a correction for irregularities, protuberances, humps, uneven or raised parts of the substrate 120. As a correction of the orientation of the floating frame 101 may be performed in a closed loop control, a reliable correction of the orientation may be achieved.

As the correction of the orientation or position of the movable chassis or floating frame 101 may be carried out taking into account a reading of the inertial sensor 170, the correction may be performed significantly quickly upon or before a vertical movement being sensed. Therefore, a high throughput rendering may be allowed without affecting the final accuracy.

In examples, an adjustment of the orientation of the floating frame 101 may be determined by the processor or controller 140 based on the sensed vertical acceleration. Thus, the printing system 100 may perform automatic diagnostics and solve any trouble related to the orientation of the floating frame 101.

In some examples, the printing system 100 may not apply a correction or adjustment of the orientation of the floating frame 101 relative to the supporting frame 102 depending on the reading of the inertial sensor 170. The processor 140 may continuously adjust the position of the nozzle 110 based on sensed data received from the inertial sensor 170. A property may be real-time controlled and the position of the nozzle 110 may be maintained accordingly.

The printing substrate 120 may be any surface(s) to receive the print fluid 111 from the print head 150 or nozzle 110. The printing substrate 120 may be, for instance, a print medium, a floor, a roof or a ground. The print medium is a material capable of receiving print agent or print fluid 111, e.g. ink. The print medium may comprise paper, cardboard, cardstock, textile material or plastic material. The print medium may be a sheet, e.g. a sheet of paper or a sheet of cardboard.

In this disclosure, the print agent or print fluid 111 may be delivered on the printing substrate 120, e.g. by firing, ejecting, spitting or otherwise depositing the print agent 111 onto the printing substrate 120.

In examples, the processor 140 of the printing system 100 may be to control the arrangement of the floating frame 101 with respect to the supporting frame 102 based on a sensed vertical acceleration or on the reading of the inertial sensor.

In some examples, a heating element may cause a rapid vaporization of print agent in a print agent chamber, increasing an internal pressure inside this print agent chamber. This increase in pressure makes a drop of print agent exit from the print agent chamber to the printing substrate through the nozzle 110. These printing systems may be referred to as thermal inkjet printing systems.

In some examples, a piezoelectric may be used to force a drop of print agent to be delivered from a print agent chamber onto the printing substrate through a nozzle. A voltage may be applied to the piezoelectric, which may change its shape. This change of shape may force a drop of print agent to exit through the nozzle 110. These printing systems may be referred to as piezo electric printing systems.

In some examples, an arrangement of coil-driven valves may be used to force a drop of print agent to be delivered from a print agent chamber onto the printing substrate through a nozzle. A voltage may be applied to the coil which may induce a displacement on a rod which then may allow the print agent to be extruded from a nozzle plate for a duration of time while the rod is lifted. When the electrical signal stops, the coil may stop providing lifting force to the rod and a delivery of print agent from the print agent chamber may be interrupted. Hence extrusion of print agent from the nozzle 110 may be stopped. These printing systems might be referred to as valvejet printing systems.

For purposes of this application, the controller or processor 140 may be a presently developed or future developed processor or processing resources that executes sequences of machine-readable instructions contained in a memory.

In some examples, the memory may be a non-transitory machine-readable storage medium 141. The non-transitory machine-readable storage medium 141 is coupled to the processor 140. FIG. 10 schematically illustrates a non-transitory machine-readable storage medium with a processor of the FIG. 1.

The processor 140 performs operations on data. In some examples, the processor is an application specific processor, for example a processor dedicated to control the printing system 100. The processor 140 may also be a central processing unit.

In some examples, the controller 140 may be used to perform a method according to any of the examples herein disclosed.

The non-transitory machine-readable storage medium 141 may include any electronic, magnetic, optical, or other physical storage device that stores executable instructions. The non-transitory machine-readable storage medium 141 may be, for example, Random Access Memory (RAM), an Electrically Erasable Programmable Read-Only Memory (EEPROM), a storage drive, an optical disk, and the like.

In examples, the printing system 100 may comprise a joint 103 to rotatably attach the floating frame 101 to the supporting frame 102. In some examples, the joint 103 may comprise an actuator 104. In examples, the actuator may be a brushless motor.

In examples, the joint 103 may comprise a bearing. In some examples, a rotation of the floating frame 101 may serve to correct the orientation.

In some examples, the position sensor 130 and the nozzle 110 may be disposed respectively at opposite sides of the joint 103. In some examples, the position sensor 130 and the print head 150 may be disposed respectively at both sides of the joint 103.

In some examples, the floating frame 101 may comprise a pair of arms 105 radially extending from the joint. In examples, the floating frame 101 may be generally elongated. An example of arms may be seen in FIG. 6.

In some examples, the printing system 100 may comprise an actuator 104 to rotate the floating frame 101 relative to the supporting frame 102. In some examples, the rotation may be performed about the joint 103.

In some examples, the printing system 100 may comprise an actuator 104 to rotate the floating frame 101 about the pitch axis PA or the roll axis RA. In some examples, the printing system 100 may comprise two actuators, an actuator to rotate the floating frame 101 about the pitch axis PA and an actuator to rotate the floating frame 101 about the roll axis RA.

In some examples, the position sensor 130 may be to sense the position of the printing system 100 relative to a printing substrate 120. In some examples, the position sensor 130 may be to sense the position of the printing system 100 relative to a beacon.

In some examples, the controller 140 may be in electric communication with the inertial sensor 170 and the actuator 104.

In some examples, the controller 140 may be in data communication with the inertial sensor 170 and the actuator 104. Therefore, a real time and accurate correction of the orientation may be obtained.

In examples, the print head 150 may comprise a print agent chamber containing print agent 111 to be delivered onto the printing substrate 120.

In some examples, the printing system 100 may be used indoor. In some examples, the printing system 100 may be used outdoor.

The printing system 100 may be scaled to any nozzle resolution and size.

In some examples, the print head 150 may be static. The print head or a plurality of print heads may extend along a width of a printing substrate, i.e. in a printing substrate width direction. A print head may be mounted in a print bar spanning a width of the printing substrate. The print bar may be mounted on the floating frame 101. A plurality of nozzles may be distributed within the print head or a plurality of print heads along the width of the printing substrate. The width of the printing substrate extends in a printing substrate width direction. The printing substrate width direction may be substantially perpendicular to the printing substrate advance direction. Such an arrangement may allow most of the width of the printing substrate to be printed simultaneously. These printing systems may be called as page-wide array (PWA) printing systems.

In some examples, the print head may travel repeatedly across a scan axis for delivering print agent onto a printing substrate which may advance along a printing substrate advance direction. The scan axis may be substantially perpendicular to the printing substrate advance direction. The scan axis may be substantially parallel to printing substrate width direction. The print head may be mounted on a carriage for moving across the scan axis. The carriage may be mounted on the floating frame. In some examples, several print heads may be mounted on a carriage. In some examples, four print heads may be mounted on a single carriage. In some examples, eight print heads may be mounted on a single carriage.

FIG. 6 schematically represents a front view of a vehicle 200 according to an example of the present disclosure. FIG. 7 schematically represents a side view of the vehicle of FIG. 6. The vehicle 200 comprises: a printing system 100 that has: a floating frame 101 connected to a supporting frame 102, the floating frame 101 having a position sensor 130 and a print head 150, a property sensor 170 indicative of vertical acceleration of the printing system 100, and a controller 140 to control the arrangement of the floating frame 101 with respect to the supporting frame 102 based on a sensed vertical acceleration.

In the example of FIG. 6, the printing system of the vehicle 200 comprises an actuator 104 to rotate the floating frame or dynamic frame 101 about the x-axis. In the example of FIG. 7, the printing system of the vehicle 200 comprises an actuator 104 to rotate the dynamic frame 101 about the y-axis.

In examples, the controller 140 of the vehicle 200 may be to adjust the orientation of the floating frame 101 with respect to the supporting frame 102 based on the measured property or sensed vertical acceleration. In some examples, the controller 140 of the vehicle may be to adjust a position of the floating frame 101 relative to the supporting frame 102 based on a reading of the inertial sensor 170 or sensed vertical acceleration.

In examples, the supporting frame 102 may carry wheels 201, 202, motor, transmission and ancillaries to move the vehicle 200.

FIG. 8 schematically represents a vehicle on a printing substrate with a drop placement error. The vehicle of FIG. 8 may have a printing system as depicted in connection with FIG. 4.

FIG. 9 schematically represents a vehicle according to an example of the present disclosure. The vehicle of FIG. 9 may have a printing system 100 as depicted in connection with FIG. 5.

In examples, the vehicle 200 may be an unmanned vehicle, e.g. a drone. In some examples, the vehicle may be an autonomous or self-driving printer. In examples, the vehicle may be a remotely controlled printer.

In some examples, the vehicle may be aerial or terrestrial. The term "aerial vehicle" refers to a vehicle able to achieve aerodynamic lift. The term "terrestrial vehicle" refers to a self-propelled wheeled vehicle.

The aerial vehicle may comprise a rotor to provide lift, a fixed wing, and a flapping wing. A driving unit may drive the rotor.

The terrestrial vehicle may comprise wheels, e.g. castor wheels 202 and main wheels 201 as shown in FIG. 7. A driving unit may drive the wheels.

In some examples, the vehicle 200 may be to be used indoor or outdoor.

FIG. 11 is a block diagram of an example of a method of the present disclosure. The method 300 comprises: measuring a property associated with a vertical displacement of a supporting frame 102 of a printing system, the printing system 100 having a floating frame 101 mounted on the supporting frame 102, and the floating frame 101 comprising a position sensor 130 of the printing system and a nozzle 110 to eject a drop of print agent at block 310, and adjusting an orientation of the floating frame 101 with respect to the supporting frame 102 based on the measured property at block 320.

In some examples, adjusting the orientation of the floating frame 101 may mean adjust an orientation of the floating frame 101 relative to the supporting frame 102 based on the measured property or reading of the inertial sensor 170.

In examples, adjusting the orientation of the floating frame 101 may comprise moving the floating frame to a predefined orientation. Adjusting the orientation of the floating frame 101 may mean controlling the arrangement of the floating frame 101 with respect to the supporting frame 102 based on a sensed vertical acceleration or measured property.

In examples, the predefined orientation of the floating frame 101 may be set with respect to a direction of gravity force.

In examples, the direction of gravity force or G force may be sensed by the inertial sensor 170. The orientation of the floating frame 101 may be adjusted following the direction of gravity force. This adjustment of orientation may be a calibration of the floating frame 101, and the orientation may be a calibrated or predefined orientation. In examples, a readout of the inertial sensor 170 related to the calibrated orientation may be an initial reference point. In some examples, the initial reference point may comprise coordinates in at least one of x, y, z axes. In examples, the initial reference point may be obtained before starting a printing task.

In examples, when the printing system 100 undergoes a vertical displacement, the controller 140 may receive data from the inertial sensor 170. The data of the inertial sensor 170 may be sensed by at least one of the accelerometer or the gyroscope. Based on the sensed data, the controller 140 may determine that the orientation of the floating frame 101 may be angularly displaced related to the calibrated position. The nozzle 110 may be offset in a plane x, y. The controller 140 may calculate a correction of the orientation of the floating frame 101 and may send a command to at an actuator 104. The command may comprise magnitude and direction of an angular displacement of the floating frame 101 about the joint 103.

In some examples, the predefined orientation of the floating frame 101 may be set without taking into account the direction of gravity force.

In some examples, adjusting the orientation of the floating frame 101 may comprise rotating the floating frame 101 about a roll axis RA or a pitch axis PA of the printing system 100.

In some examples, adjusting the orientation of the floating frame 101 may comprise moving the floating frame 101 in a non-rotatably way.

In some examples, the measured property may be the vertical acceleration.

In some examples, the measured property may be the angular speed. The angular speed may be associated to the roll axis RA or pitch axis PA of the printing system. A difference between at least two values of angular speed may be related to a vertical acceleration. In some examples, the difference between two values of angular speed may be computed by the controller 140.

Upon the method 300 of FIG. 11 substrate conditions-induced errors on drop placement may be minimized.

As an adjustment of the orientation or position of the floating frame 101 may be performed based on the measured property, the adjustment may be performed significantly quickly upon or before a vertical displacement being sensed. Therefore, a high throughput rendering may be allowed without affecting the final accuracy.

Adjustments of the orientation of the floating frame 101 may be performed based on measured properties, so a closed loop control may be defined, and a reliable correction of the orientation may be achieved.

In this method, the printing system 100 may be according to any of the examples herein disclosed.

The non-transitory machine-readable storage medium 141 may be encoded with instructions which, when executed by the processor 140, cause the processor 140 to measure a property associated with a vertical displacement of a supporting frame 102 of a printing system 100, the printing system 100 having a floating frame 101 mounted on the supporting frame 102, and the floating frame 101 comprising a position sensor 130 of the printing system 100 and a nozzle 110 to eject a drop of print agent. The instructions when executed by the processor 140 may cause adjust the orientation of the floating frame 101 with respect to the supporting frame 102 based on the measured property.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A method comprising:

measuring a property associated with a vertical displacement of a supporting frame of a printing system, the printing system having a floating frame mounted on the supporting frame, and the floating frame comprising a position sensor of the printing system and a nozzle to eject a drop of print agent; and adjusting an orientation of the floating frame with respect to the supporting frame based on the measured property, wherein the vertical displacement is associated with a movement of the supporting frame about a pitch axis and a roll axis of the supporting frame.

2. The method of claim 1, wherein:

adjusting the orientation of the floating frame comprises moving the floating frame to a predefined orientation.

3. The method of claim 2, wherein:

the predefined orientation of the floating frame is set with respect to a direction of gravity force.

4. The method of claim 1, wherein:

adjusting the orientation of the floating frame comprises rotating the floating frame relative to the supporting frame.

5. The method of claim 1, wherein:

the measured property is the vertical acceleration.

6. The method of claim 1, wherein:

the measured property is the angular speed.

7. A printing system comprising:

a floating frame movably attached to a supporting frame;

the floating frame to carry a nozzle to eject a drop of print agent, and a position sensor;

an inertial sensor indicative of vertical movement of the printing system;

a processor to adjust a position of the floating frame relative to the supporting frame based on a reading of the inertial sensor;

a first actuator to rotate the floating frame about a pitch axis; and a second actuator to rotate the floating frame about a roll axis, wherein the vertical displacement is associated with a movement of the supporting frame about the pitch axis and the roll axis of the supporting frame.

8. The printing system of claim 7, comprising:

an actuator to rotate the floating frame with respect to the supporting frame.

9. The printing system of claim 7, comprising:

a joint to rotatably attach the floating frame to the supporting frame.

10. The printing system of claim 9, wherein the position sensor and the nozzle are disposed respectively on opposite sides of the joint.

11. The printing system of claim 10, wherein the floating frame comprises a pair of arms radially extending from the joint.

12. The printing system of claim 7, wherein the position sensor is to sense the position of the printing system relative to a printing substrate.

13. A vehicle comprising:

a printing system having:

a supporting frame;

a floating frame connected to the supporting frame, the floating frame having a position sensor and a print head;

a property sensor indicative of vertical acceleration of the printing system;

a controller to control the arrangement of the floating frame with respect to the supporting frame based on a sensed vertical acceleration; and one or more wheels connected to the supporting frame, the one or more wheels to move the vehicle.

* * * * *